Figure 1:
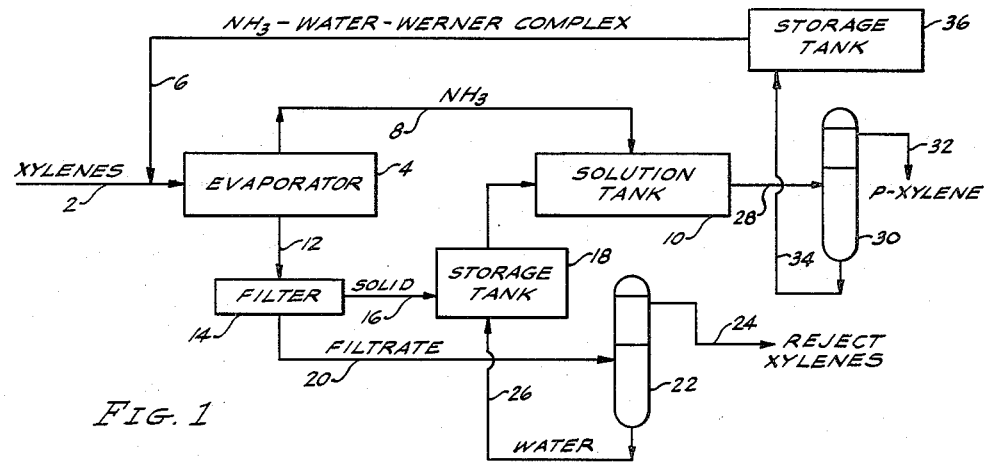

July 10, 1962  W. D. SCHAEFFER  3,043,892
SEPARATION OF ORGANIC COMPOUNDS WITH WERNER COMPLEXES
Filed Dec. 28, 1959

INVENTOR.
WILLIAM D. SCHAEFFER
BY
Lannas S. Henderson
AGENT

United States Patent Office 3,043,892
Patented July 10, 1962

3,043,892
SEPARATION OF ORGANIC COMPOUNDS WITH WERNER COMPLEXES
William D. Schaeffer, Pomona, Calif., assignor to Union Oil Company of California, Los Angeles, Calif., a corporation of California
Filed Dec. 28, 1959, Ser. No. 862,223
18 Claims. (Cl. 260—674)

This invention relates to methods for separating difficultly separable organic compounds such as isomers, e.g. xylenes and the like. Broadly stated, the method consists in selectively absorbing, or "clathrating" one component of the mixture into a solid, water-insoluble, Werner-type complex of a metal salt and a heterocyclic nitrogen base, and then recovering the clathrated compound from the solid clathrate by dissolving the latter in an aqueous solution of a relatively strong nitrogen base such as ammonia. The clathration step is preferably accomplished by precipitating dissolved Werner complex from an aqueous strong nitrogen base solution thereof while intimately contacting the same with the mixture of organic compounds to be separated. In this preferred clathration technique, the strong base is a relatively volatile compound such as ammonia, whereby the precipitation of Werner complex, and thus the clathrate, may be effected by evaporating all or a portion of the volatile base from the solution. During the resulting precipitation of Werner complex, feed components of one particular configuration are selectively absorbed therein, forming the clathrate compound. The resulting clathrate may then be separated from the remaining liquid and dissolved in reconstituted aqueous solution of the volatile base to liberate the clathrated components and reform the volatile base solution of Werner complex for recycle to the clathration step. The liberated organic phase will be found to be substantially richer in one or more feed components than was the original mixture, and the non-clathrated raffinate phase will be correspondingly leaner in such components.

The present invention is based upon my basic discovery that certain organic Werner complexes are capable of selectively absorbing or occluding, either during or after formation of their crystalline structure, certain organic compounds, while other organic compounds of similar chemical and physical properties are absorbed to a much smaller extent, or not at all (U.S. Patent No. 2,798,-891). The specific explanation for this phenomenon is not known with certainty, but present information indicates that a "clathrate" type compound may be formed.

The "clathration" mechanism of the present invention differs from that of the classical forms of clathration, as described for example by Powell (J. Chem. Soc. (London) 1948 pp. 61–73.). The classical clathrate formers are non-versatile; they will form stable clathrates only with foreign molecules of one particular dimension, coinciding with the dimensions of the crystal void spaces of the clathrate former. But the organic Werner complex clathrate formers described herein are found to be versatile in their clathrating properties. It is not essential that the included foreign molecules coincide in size or shape with the pre-existing crystal void spaces of the Werner complex. The same Werner complex will form clathrates with molecules varying widely in size and shape, from for example benzene to anthracene.

Compounds which are predominantly aromatic in character exhibit a markedly greater tendency to form clathrates with the instant Werner complexes than do the less aromatic compounds. However, even when all compounds in the mixture to be separated are equally aromatic in character, one will be selectively clathrated in preference to others. The methods of the present invention are hence applicable to the separation of mixtures of the following types:

(1) Wholly aromatic, i.e., all components are predominantly or significantly aromatic in character. In this case one aromatic compound is selectively clathrated in preference to another, due primarily to steric differences in molecular form.

(2) Partially aromatic, i.e., one component is appreciably more aromatic in character than another. In this case, the more aromatic compound or compounds will in general be selectively clathrated in preference to the less aromatic compound or compounds.

Since my discovery of the basic clathration process using organic Werner complexes, various techniques have been developed for carrying out the clathration step, and for recovering the clathrated component from the clathrate. For most purposes, the clathration technique which has been considered most advantageous in the past involves the use of organic solvent media such as methyl Cellosolve or ethylene glycol, as described in U.S. Patents Nos. 2,849,511 and 2,849,513. Despite their virtues, these processes are disadvantageous in that they require the use of fairly large volumes of expensive solvents which dilute the feed mixtures and thereby reduce the efficiency of clathration. They also require a considerable investment in processing equipment. Another problem which has heretofore been common to nearly all clathration techniques, including the organic solvent methods, involves the necessity of using heat to recover the clathrated component from the clathrate. The organic Werner complexes are relatively unstable and tend to lose nitrogen base upon heating, with the result that thermal recovery of the clathrated compound tends to cause some dissociation of Werner complex, resulting in contamination of the recovered compound with nitrogen base. These difficulties are not insurmountable, and various techniques have been developed for dealing with them, as in U.S. Patent No. 2,798,102, but in general the mitigation of these problems has always involved added processing costs and equipment investment which, through entirely feasible, leave considerable room for improvement.

It has now been discovered that the water-insoluble Werner complexes of heterocyclic nitrogen bases can be readily dissolved in aqueous ammonia, and that when ammonia is evaporated from the resulting solution, the original Werner complex is precipitated almost quantitatively when the ammonia concentration reaches a sufficiently low level. Essentially the same phenomena take place when other low molecular weight, water soluble volatile bases are used, provided that the volatile base is more basic than the heterocyclic base used in the Werner complex. It has also been found that if the mixture to be separated is agitated or slurried with the Werner complex solution during precipitation from the volatile base solution, a remarkably efficient (in terms of specific resolution and clathration capacity) selective clathration takes place. It has also been discovered that the resulting solid clathrate may be easily and completely dissolved in aqueous ammonia or other strong nitrogen base with little or no heating, thereby liberating the clathrated component and reforming the Werner complex solution for use in the clathration step. The liberated clathrated component may then be easily recovered by decantation, settling, distillation, solvent extraction or the like.

The non-clathrated component of the feed mixture (raffinate) is separated from the volatile base-lean liquid phase from the clathration step, either before or after separation of the solid clathrate therefrom. Following removal of clathrate and raffinate, the volatile base-lean aqueous phase, usually containing some dissolved heterocyclic base and Werner complex, may then be used to absorb the volatile base taken off in the clathration step and to dissolve the clathrate, thereby "springing" the clathrated compound (extract) and regenerating the volatile base Werner complex solution. Thus a continuous recycle of volatile base, water and Werner complex may be maintained with little or no loss of Werner complex or heterocyclic base. In some cases, small amounts of Werner complex and/or heterocyclic base may dissolve in the raffinate or extract, but may be easily recovered therefrom by distillation, solvent extraction, azeotropic distillation, or the like.

It will hence be apparent that the principal object of this invention is to provide a simple and economical technique for carrying out a selective clathration, and for recovering the clathrated component. A specific object is to provide a method for recovering the clathrated component without substantial heating, thereby avoiding decomposition of the Werner complex and permitting recovery thereof in a form suitable for recycle. Another object is to provide a more efficient and economical technique for carrying out the clathration step. A specific object is to provide an economically competitive process for resolving close-boiling mixtures of aromatic hydrocarbons, especially the xylene isomers and cymene isomers. Other objects will be apparent from the more detailed description which follows.

Figure 2:
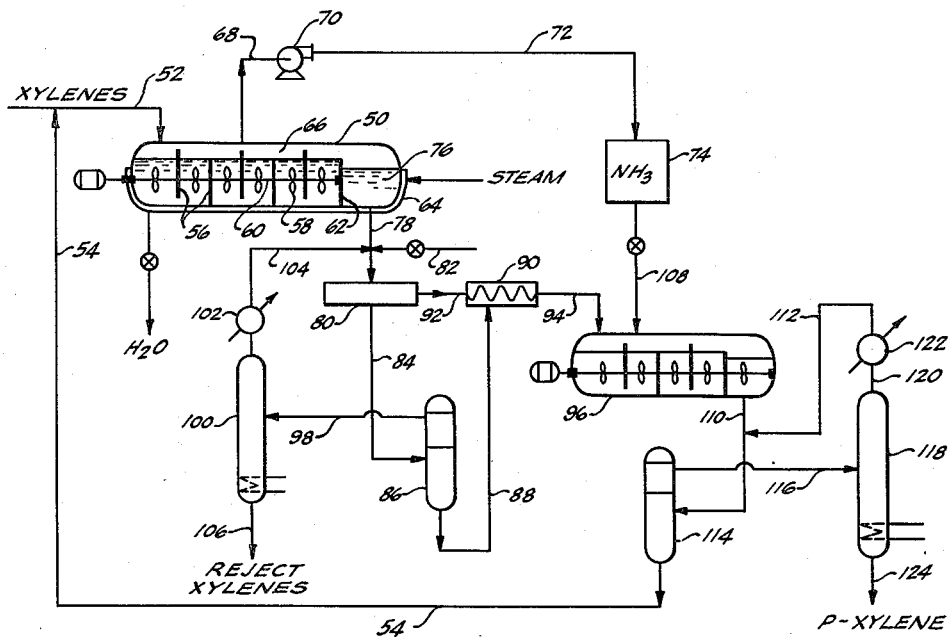

Reference is now made to the accompanying drawings, which are flow diagrams illustrating two modifications of the process. FIGURE 1 illustrates schematically a batch-type operation, while FIGURE 2 illustrates in more detail a continuous modification employing auxiliary solvents and/or azeotroping agents. These modifications will be described with specific reference to the separation of xylene isomers using ammonia as the volatile base, but it will be understood that they are broadly applicable, with slight modifications, to the separation of other mixtures using other volatile bases within the purview of this invention.

In FIGURE 1, feed xylenes are brought in through line 2 and admixed in evaporator 4 with a recycle solution of the Werner complex in aqueous ammonia, which is led into evaporator 4 via line 6. Evaporator 4 may comprise any suitable vessel of iron or other construction material, and is preferably equipped with heating means and agitating means, not shown. In evaporator 4, the mixture of xylenes and Werner complex solution is subjected to suitable conditions of temperature and pressure to cause evaporation of gaseous ammonia, which is taken off via line 8. The ammonia in line 8 is transferred to a solution tank 10, which may suitably be of similar size and characteristics as evaporator 4, and which is filled with a charge of slurry comprising solid clathrate in weak ammonia solution, the slurry being derived from a preceding batch of product from evaporator 4. By suitably adjusting the temperature and pressure in solution tank 10, the ammonia-lean slurry therein is made to absorb gaseous ammonia from line 8 substantially as rapidly as it is produced in evaporator 4. Thus, while clathrate formation is proceeding in evaporator 4 as a result of ammonia evolution, clathrate solution is taking place in solution tank 10 as a result of ammonia being dissolved therein.

The transfer of ammonia from evaporator 4 to solution tank 10 is continued until a substantial desired proportion of solid clathrate has formed in evaporator 4. Ordinarily, solution of clathrate in tank 10 takes place somewhat more rapidly than clathrate formation in evaporator 4, but this relationship is extremely variable depending upon temperatures and pressures in the respective vessels. The charges in evaporator 4 and solution tank 10 may hence be discharged simultaneously or alternately, depending upon the conditions.

Upon completion of the desired degree of clathrate formation in evaporator 4, the entire charge, consisting of a slurry of solid clathrate, liquid raffinate, and dilute aqueous ammonia solution, is passed via line 12 through filter 14. The solid clathrate is transferred from the filter via line 16 to storage tank 18. The filtrate is transferred via line 20 to settling vessel 22 wherein stratification of liquid phases takes place. The supernatant raffinate xylenes are withdrawn via line 24 and sent to storage not shown. The lower aqueous phase in separator 22 is transferred to storage tank 18 via line 26, forming a slurry therein with the solid clathrate. As soon as evaporator 4 is emptied of its charge, it may be refilled with another batch of ammoniacal Werner complex solution.

Upon completion of clathrate solution in tank 10, with resultant springing of the clathrated para-xylene, the two-phase mixture is transferred via line 28 to a second settling vessel 30 wherein the phases are allowed to stratify. Enriched para-xylene is withdrawn as the upper phase via line 32. The lower aqueous phase of reconstituted ammoniacal Werner complex solution is taken off via line 34 and transferred to second storage tank 36 to be used in the next charge to evaporator 4. Upon emptying solution tank 10, it may then be refilled with the next charge of slurry from storage tank 18. This completes the cycle, and the slurry in solution tank 10 is in condition for absorbing ammonia from the fresh charge of xylenes and ammoniacal Werner complex solution in evaporator 4.

Reference is now made to FIGURE 2 for a more detailed showing of a continuous xylene separation process, employing additional measures to insure added purity of product, and to insure against loss from the system of the heterocyclic base. The feed xylenes are brought into the inlet end of a continuous evaporator 50 via line 52, and recycle ammoniacal Werner complex solution is admitted via line 54. Evaporator 50 consists of an elongated vessel divided vertically into several communicating compartments by means of staggered baffles 56. Each of the resulting compartments is provided with suitable agitating means to provide substantially uniform mixing throughout at least the major part of the vessel. In the modification illustrated, the agitating means consists of a series of propellers 58 attached to a power driven shaft 60, which traverses the vessel from the inlet end to terminal baffle 62. A suitable steam jacket 64 is provided in order to maintain the desired temperature within the vessel, and to compensate for evaporative heat losses. It will be noted that baffles 56 provide essentially a tortuous linear path to direct the fluid flow alternately under one baffle and over the top of the next. This provides uniform control over the residence time of each portion of charge, and largely prevents internal recycle. It has been found that residence times ranging between about 5 minutes and 2 hours are necessary, preferably between about 10 minutes and 1 hour. Suitable temperatures range between about 20° C. up to the boiling point of water, and preferably between about 30° and 65° C. It is also preferred to maintain reduced pressures in evaporator 50, e.g. 5–500 mm. Hg, in order to permit the use of lower temperatures. High temperature operation, e.g. at the atmospheric boiling point of the ammonia solution, inhibits completion of the clathrate-forming reaction:

Werner complex+clathratable compound⇌clathrate thereby reducing the overall efficiency.

As will be apparent, the feed xylenes and the recycle Werner complex solution enter evaporator 50 at its left extremity and travel generally horizontally toward the right through each of the communicating compartments. Throughout the travel, agitator blades 58 maintain intimate admixing between the liquid phases and the solid phase as it is formed. The phase relationships obtaining during the clathrate precipitation are sometimes fairly complex. The initial xylene phase is lighter than the aqueous phase, but is has been observed that the clathrate crystals tend to form in, and remain associated with, the xylene phase. As a result, the solid clathrate tends, as it forms, to cause the xylene phase or a portion thereof to sink in the aqueous solution. As a result, toward the end of the ammonia evaporation cycle, there may exist a lighter-than-water xylene phase and a heavier-than-water xylene-clathrate phase. Since each of these organic phases may contain components which should be reacted with components of the other phase and/or with the aqueous phase, the desirability of continuous agitation is apparent.

During the clathrate formation, gaseous ammonia is continuously evolved over the length of the vessel, and collects in vapor space 66, from which it is continuously withdrawn via line 68 and pump 70, and is then transferred via line 72 to surge tank 74. It is ordinarily not feasible to so completely strip the solution of ammonia as to obtain quantitatively complete precipitation of the Werner complex. This however is primarily a matter of preference and economics and is not a critical aspect of the invention. It is only necessary to precipitate sufficient Werner complex to clathrate the desired amount of para-xylene. The initial solution of Werner complex may contain from about 10 to 60% by weight of Werner complex, and it is ordinarily feasible to reduce this concentration to about 0.5 to 5% by suitable removal of ammonia. Aqueous ammonia containing between about 5% and 28% by weight of ammonia may be employed, preferably between about 10% and 20%.

Upon the desired completion of clathrate formation, the resulting clathrate slurry flows over the top of end-baffle 62 into slurry withdrawal zone 76, which may either be quiescent or agitated as desired. The resulting slurry is withdrawn continuously via line 78 and transferred to a suitable filter 80, or other means for separating solids from liquids, e.g. a centrifuge or settler. It has been found desirable however to admix with the slurry prior to filtering, a suitable paraffinic or naphthenic hydrocarbon via line 82, in order to dilute the raffinate xylene phase, thereby facilitating its separation from the adhering solid clathrate. Also, aromatic hydrocarbons such as xylenes have some slight solvent capacity for the Werner complex, and the addition of paraffin or naphthene hydrocarbons is found to reduce substantially the solubility of the Werner complex in the raffinate xylene phase. Any liquid paraffin or naphthene hydrocarbons may be used for this purpose, but for additional purposes to be described hereinafter, it is preferred to use hydrocarbons boiling in the range of about 90 to 135° C., e.g. heptane, octane, nonane, or mixed hydrocarbon fractions boiling in this range such as a 120 to 130° C. alkylate fraction.

The filtrate from filter 80 now consists of two liquid phases, viz. a raffinate phase comprising reject xylenes and paraffin hydrocarbon, and a lower aqueous phase containing a small amount of dissolved ammonia and Werner complex. This mixture is transferred via line 84 to a settling vessel 86 wherein stratification is allowed to take place. The lower aqueous phase is withdrawn via line 88 and transferred to a suitable mixing device 90, such as a screw conveyor, wherein it is blended with the solid clathrate which is transferred thereto from filter 80 via line 92. In mixer 90, a slurry of clathrate in the aqueous phase is formed which is then conveniently transferred via line 94 to solution tank 96 for treatment as hereinafter described.

The hydrocarbon phase in separator 86 is transferred via line 98 to distillation column 100, which serves the primary purpose of separating the paraffin hydrocarbon from the raffinate xylenes, and the secondary but important purpose of stripping from the xylenes any heterocyclic nitrogen base which may have become dissolved therein in evaporator 50. The preferred heterocyclic base used herein is 4-methylpyridine, which boils very close to xylenes and is hence difficultly separable therefrom. By suitably selecting the paraffin hydrocarbon added via line 82, this problem is solved by the formation of a low boiling azeotrope between the nitrogen base and the paraffin hydrocarbon. This azeotrope is taken off via condenser 102 and line 104, as well as any excess paraffin hydrocarbon, and the mixture is continuously recycled to the clathrate slurry in line 78. Thus, once the process is initiated, little or no paraffin need be added via line 82 since it is essentially all recovered for recycle. The heterocyclic base which is recycled with the paraffin in line 104 is mostly dissolved in the aqueous phase of the slurry in line 78, thereby preventing its build-up in the hydrocarbon phase going to column 100. Thus, the unclathrated raffinate xylenes are withdrawn from column 100 via line 106 in substantially pure form.

In solution tank 96, the continuous dissolving of clathrate in the aqueous slurry admitted via line 94 is effected by the redissolving of ammonia added via line 108 from surge tank 74. Solution tank 96 may be constructed similarly to evaporator 50 and will hence not be described in detail. It is ordinarily preferable to maintain temperatures in solution tank 96 similar to those utilized in evaporator 50, and hence temperature control measures are omitted, but it is not intended to exclude any suitable temperature adjustment therein, which may be accomplished by conventional means. Obviously, if the temperature in solution tank 96 is substantially the same as that in evaporator 50, higher pressures will be required in solution tank 96 to permit the dissolving of ammonia. Ordinarily, atmospheric pressures are utilized, but superatmospheric pressures are contemplated, e.g. up to 50 or 100 atmospheres if desired. As in evaporator 50, a tortuous linear flow path is maintained in solution tank 96, with suitable agitation to hasten solution of the clathrate. It is not essential to employ agitation in this step of the process, but generally it will be found that the dissolving of clathrate is materially hastened thereby. The resulting two-phase liquid mixture, comprising extract xylenes and ammoniacal Werner complex solution is withdrawn via line 110 and admixed with recycle paraffin hydrocarbon from line 112. The paraffinic or naphthenic hydrocarbon used at this stage may be the same as the hydrocarbon previously described in reference to column 100, and its purpose is similar, namely to lower the solubility of the Werner complex and the heterocyclic base in the xylene phase, and to provide an azeotroping agent for removing heterocyclic nitrogen base from the xylene phase. The resulting mixture is passed into separator 114 wherein the two phases are allowed to stratify. The lower aqueous phase is withdrawn via line 54 and recycled to exaporator 50 as previously described. The xylene phase in separator 114 is withdrawn via line 116 and sent to distillation column 118 from which the heterocyclic base-paraffin hydrocarbon azeotrope, plus any excess paraffin hydrocarbon is taken overhead via line 120 and condenser 122 for recycle to line 110. Enriched para-xylene is withdrawn as bottoms from column 118 via line 124.

The para-xylene recovered as above described may be of substantially any desired purity depending upon the ratio of Werner complex to feed mixture and other factors such as the efficiency of contacting and completeness of clathration in evaporator 50. It is ordinarily preferable not to attempt to obtain 100% pure p-xylene in a single stage; it is preferable to employ multi-stage clathration, or de-clathration, where high purity is desired. According to one modification of multi-stage de-clathration, the clathrate may be partially dissolved in one stage by adding only a part of the ammonia required for complete dissolving, and the dissolution completed in a second stage by adding a sufficient increment of ammonia. The p-xylene (or other clathrated component) recovered from the second stage of dissolving will be of substantially greater purity than the xylene recovered from the first stage. The xylene recovered from the first stage may, if desired, be recycled to the clathration step along with the fresh feed.

While, as indicated above, it is generally preferred to carry out the clathration step integrally with the extract recovery system, it is not intended to exclude forming the clathrate in an extraneous system, and then decomposing the clathrate in aqueous base solution. For example, the clathrate may be formed by merely contacting the Werner complex with the feed mixture, or by precipitating the Werner complex from an extraneous solvent system in the presence of the feed mixture.

The Werner-type complexes employed herein are made up of at least three components. The fundamental unit is a water-soluble salt of a metal having an atomic number above 12 which is capable of forming coordinate complexes of the Werner type. This includes primarily the metals of groups IB, IIB, VIB, VIIB, and VIII of the Periodic Table, such for example as iron, cobalt, nickel, copper, zinc, cadmium, silver, manganese, chromium, mercury, and molybdenum. Aluminum may also be used in some instances. The preferred metals are those of atomic number 25 to 28 inclusive, i.e. manganese, iron, cobalt and nickel.

The anion of the metal salt may comprise any acid-forming negative radical, the salts of which will form relatively water-insoluble Werner complexes with heterocyclic nitrogen bases. The preferred anions are polyatomic monovalent anions, such as thiocyanate, isothiocyanate, azide, cyanate, isocyanate and cyanide. Other operable anions include formate, acetate, propionate, and the like.

The second major component of the Werner complexes consists of one or more heterocyclic nitrogen base or bases, which are bound to the central metal atom through coordinate bonds. The operative complexes are mainly of the tetra- and hexa-coordinate types, wherein the metal atom is coordinated with four or six atoms of basic nitrogen. The heterocyclic base should be selected so as to give a maximum selective absorption for the particular compound which is to be absorbed into the crystal lattice of the complex. For example, if it is desired to absorb p-xylene, a very suitable nitrogen base is gamma-picoline. Not all nitrogen bases are equally effective in forming complexes which will absorb the desired component. For example, the beta-picoline complex with nickel thiocyanate is not as effective as the gamma-picoline complex for absorbing para-xylene, presumably because of the steric effects of the 3-methyl group. However, the beta-picoline complex may be used advantageously for absorbing other compounds. The nitrogen bases should therefore be selected by a judicious combination of theoretical reasoning and actual testing of the complexes with the particular mixture to be separated. The over-all molecular dimensions of the nitrogen base should preferably approximate the molecular size of the compound to be absorbed in the complex.

In general, any heterocyclic nitrogen base may be employed which is sufficiently basic to form coordinate complexes with the above-described salts, but is weaker as a base than the strong base which is to be used for solubilizing the clathrate. This includes monocyclic and polycyclic compounds, wherein at least one of the heterocycles contains from one to three hetero-N atoms. In over-all size, the nitrogen base may contain from three to about thirty carbon atoms, preferably from four to fifteen. Interfering functional groups such as —COOH should be absent, but other more neutral, relatively non-coordinating functional groups may be present such as halogen, hydroxyl, nitro, alkoxy, aryloxy, amino, cyano, carboalkoxy, alkanoyl, acetyl, etc., provided such functional groups are compatible with any functional groups present in the mixture of compounds to be separated. Examples of suitable bases include pyridine, substituted pyridines, piperidines, substituted piperidines, and the like.

A particularly preferred class of heterocyclic bases are the resonance-stabilized bases which contain one to three, but preferably one, hetero-N atoms. Suitable examples are pyridine, the picolines, pteridine, triazole, quinoline, the quinaldines, isoquinoline, pyrimidine, pyrazine, pyridazine, and substituted derivatives of such compounds. Of this preferred class, a sub-group which is particularly and especially the 4-substituted, the 3-substituted, and the versatile and useful comprises the substituted pyridines, 3,4 disubstituted pyridines. These compounds form relatively stable Werner complexes capable of selectively forming clathrates stable at room temperatures with a wide variety of aromatic compounds. Suitable substituted pyridines comprise the folowing:

4-methyl pyridine
4-ethyl pyridine
4-n-propyl pyridine
4-isopropyl pyridine
4-n-butyl pyridine
4-n-hexyl pyridine
4-vinyl pyridine
4-fluoro pyridine
4-chloro pyridine
4-bromo pyridine
4-hydroxy pyridine
4-hydroxymethyl pyridine
4-methoxy pyridine
4-amino pyridine
methyl isonicotinate
4-cyana pyridine
4-acetyl pyridine
4-chloromethyl pyridine
3-methyl pyridine
3-ethyl pyridine
3-n-propyl pyridine
3-isopropyl pyridine
3-n-butyl pyridine
3-vinyl pyridine
3-chloro pyridine
3-hydroxy pyridine
3-methoxy pyridine
3-acetyl pyridine
3-cyano pyridine
ethyl nicotinate
3,4-dimethyl pyridine
3,4-diethyl pyridine
3-methyl, 4-ethyl pyridine
4-methyl, 3-ethyl pyridine
4-methyl, 3-n-hexyl pyridine
4-methyl, 3-cyano pyridine
4-chloro, 3-methyl pyridine
4-acetyl, 3-methyl pyridine
4-methoxy, 3-ethyl pyridine
Isoquinoline Many other similar examples could be cited, as will be apparent to those skilled in the art, and the complexes may include only one such base, or a mixture of two or more may be employed, in which case a mixed complex may be formed.

The preferred Werner complexes of monovalent anion salts of this invention may be designated by the following general formula:

$$[A_n X \cdot Z_y]$$

wherein X is the metal atom as above defined, Z is the heterocyclic nitrogen base, A is the anion as above defined, y is a number from 2 to 6, and n is a number from 1 to 3.

Examples of suitable complexes which may be employed are as follows:

[Ni(γpicoline)$_4$(SCN)$_2$]
[Cu(γpicoline)$_4$(SCN)$_2$]
[Hg(γpicoline)$_4$(NNN)$_2$]
[Co(pyridine)$_4$(OCN)$_2$]
[Fe(pyrrole)$_4$(SCN)$_2$]
[Co(γpicoline)$_4$(CN)$_2$]
[Ag(γpicoline)$_2$(NNN)$_2$]
[Ni(4-methylpyridine)$_4$(NNN)$_2$]
[Ni(4-n-propylpyridine)$_4$(SCN)$_2$] 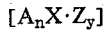
[Ni(isoquinoline)$_4$(SCN)$_2$]
[Ni(4-ethylpyridine)$_4$(SCN)$_2$]
[Mn(4-methylpyridine)$_4$(SCN)$_2$]
[Mn(isoquinoline)$_4$(SCN)$_2$]

Obviously many other complexes similar to the above could be employed, not all of which would give optimum separation of all mixtures but which should be selected to meet the specific peculiarities of the mixture concerned.

The amount of complex to be employed, relative to the feed mixture, depends upon its specific capacity for absorbing the particular feed component concerned, and also upon the proportion of that component present in the original mixture, as well as upon the temperature of clathration. The complexes are found in general to be capable of absorbing between about 5% to 70% by weight of absorbable compounds. Optimum efficiency may require that more or less than this "stoichiometric" amount of complex be employed, depending upon its relative capacity for other components in the mixture to be resolved. In general, the amount of complex to be employed may vary between about 0.25 and 20 parts by weight per part of the feed component to be clathrated. Smaller proportions of complex will generally yield a purer extract, while the larger proportions result in more complete recovery of absorbable components from the feed mixture.

The term "clathrating" as used herein is intended to mean any absorption or adsorption by the herein described Werner complexes of a sorbable organic compound, regardless of the mechanism by which such sorption may take place. The terms "absorbate" or "extract" refer to the total feed component which is absorbed into the clathrate, thus excluding the nitrogen bases, which are bound by coordinate valences. The term "aromatic" is intended to include all resonance-stabilized, cyclic, unsaturated compounds, which exhibit predominantly substitution rather than addition reaction toward electrophilic reagents. (cf. A.E. Remick, Electronic Interpretation of Organic Chemistry, John Wiley, N.Y. 1943.)

A wide variety of feed mixtures may be resolved by the methods described herein. These methods are operative for separating substantially any mixture of organic compounds wherein the components differ in molecular configuration, and wherein at least one component is substantially aromatic in character. By "substantially aromatic" is meant that at least about 20% of the carbon atoms in the molecules to be clathrated are present as digits of an aromatic ring, the term "aromatic" having the meaning hereinafter specified. Any remaining carbon atoms may be present as saturated or unsaturated aliphatic side-chains, or saturated or unsaturated non-aromatic ring systems. Such compounds may contain a total of from 4 to 60 carbon atoms, preferably from 6 to 20.

A difference in "molecular configuration", as referred to herein, means a difference in molecular size or shape as a result of differences in (1) the number of atoms per molecule, and/or (2) the arrangement of atoms within the respective molecules, and/or (3) the size of the atoms present in the respective molecules.

Any number and type of functional groups may be present in the feed components, provided that such groups are compatible with the Werner complex employed, i.e., that such groups do not change the chemical character of the Werner complex. Generally excluded are those compounds which are either so acidic as to decompose the Werner complex, or so basic as to displace the heterocyclic base from the Werner complex. In general, the pH of an aqueous mixture of the compounds to be separated should fall between about 4 and the pH of an aqueous solution of the heterocyclic base employed in the Werner complex. When the compounds are too acidic or too basic, it is feasible to prepare neutral derivatives of such compounds, e.g., salts, esters, ethers, amides, etc., and then effect separation of the neutral derivatives.

Whenever any mixture of compounds is so incompatible with the Werner complex that the normal clathration procedures herein described result primarily in chemical decomposition, change, or disruption of the Werner complex, as opposed to the desired clathration, the contacting of such mixtures with the Werner complex is by definition excluded from the term "clathration" as used herein and in the claims. Functional groups which generally do not disrupt the normal clathration reaction, and may hence be present in the feed components are as follows: —F, —Cl, —Br, —I, $NO_2$, aryl —$NH_2$, —OR, alkyl—OH, aralkyl—OH, =CO, —CHO, —CN, —SCN, —NCO, —COOR, —COR, —COO-metal, —SR, —$CONH_2$, wherein R is a hydrocarbon radical. Many groups of a similar nature may be present. Functional groups which are generally, though not always, disruptive and to be avoided are —SH, aryl—OH, —COOH, and the like, unless they are first converted to more nearly neutral derivatives.

Examples of mixtures which may be separated herein include the following, but these examples are by no means exhaustive:

(A) Hydrocarbon mixtures:

o-ethyl toluene
p-ethyl toluene o-ethyl toluene
m-ethyl toluene p-ethyl toluene
m-ethyl toluene Mesitylene
Pseudocumene Cumene
Mesitylene Cumene
Pseudocumene p-cymene
p-diethylbenzene m-cymene
Mesitylene Prehnitene
Durene Durene
Isodurene Prehnitene
Isodurene Cyclohexane
Benzene Methyl-cyclohexane
Toluene Benzene
n-heptane Benzene
2,3-dimethyl pentane Methyl cyclopentane
Benzene Picene
Chrysene Picene
1,2,5,6-dibenzanthracene Tetralin
Napthalene Tetralin
Decalin Diphenyl
Diphenyl methane Anthracene
Phenanthrene 1-methyl anthracene
1-methyl phenanthrene Napthalene
Diphenyl 1-methyl anthracene
2-methyl anthracene 1-methyl naphthalene
2-methyl naphthalene 1-ethyl naphthalene
2-ethyl naphthalene p-di-n-propyl benzene
hexamethyl benzene o-cymene
p-cymene o-cymene
m-cymene m-cymene
p-cymene p-methyl styrene
m-methyl styrene p-methyl styrene
o-methyl styrene (B) Hydrocarbon-non-hydrocarbon mixtures:

2,5-dimethyl furan
Benzene

Anthraquinone
Anthracene

Benzene
Thiophene 2-methyl thiophene
Toluene o-xylene
Thiophene

Naphthoquinone
Naphthalene (C) Non-hydrocarbon mixtures:
o-methyl toluate
p-methyl toluate o-methyl toluate
m-methyl toluate p-methyl toluate
m-methyl toluate 1-nitro naphthalene
2-nitro naphthalene 1-amino naphthalene
2-amino naphthalene Aniline
Nitrobenzene o-toluidine
p-toluidine o-nitrotoluene
p-nitrotoluene o-dichlorobenzene
p-dichlorobenzene o-chlorotoluene
p-chlorotoluene o-methyl anisole
p-methyl anisole Coumarin
Vanillin Furan
Thiophene Sodium p-cresylate
Sodium m-cresylate Potassium terephthalate
Potassium isophthalate Dimethyl isophthalate
Dimethyl terephthalate Dimethyl isophthalate
Dimethyl orthophthalate Sodium o-toluene sulfonate
Sodium p-toluene sulfonate Sodium-1-methyl-3-naphthalene sulfonate
Sodium-1-methyl-4-naphthalene sulfonate Estriol
Estrone Estriol
Estradiol Picolinic acid
Nicotinic acid Thymol
Menthol 2-naphthol-6-sodium sulfonate
2-naphthol-8-sodium sulfonate p-amino benzaldehyde
o-amino benzaldehyde Benzidine
p-semidine 2,4-dinitro-chloro-benzene
2,5-dinitro-chloro-benzene Isosafrol
Piperonal o-vanillin
Isovanillin o-vanillin
Vanillin o-phenylene diamine
p-phenylene diamine p-phenetidine
Phenacetin Isoeugenol
Vanillin p-methyl thiophenol
m-methyl thiophenol Diazoaminobenzene
p-aminoazobenzene N,N-dimethyl aniline
Aniline Methyl benzoate
Ethyl benzoate Terephthalonitrile
Isophthalonitrile p-tolunitrile
m-tolunitrile Methyl salicylate
Methyl p-hydroxy benzoate p-methyl acetanilide
m-methyl acetanilide p-aminobenzenesulfonamide
m-aminobenzenesulfonamide Sodium anthranilate
Sodium phthalamate Alpha-picoline
Beta-picoline 2,4-lutidine
2,6-lutidine It will be noted that some of the foregoing compounds are fairly soluble in water. In general this does not affect the clathration step, but may necessitate using different techniques for recovering the raffinate and extract products from aqueous solution. Conventional techniques such as solvent extraction, distillation, fractional crystallization, chemical scavenging, precipitation or the like may be utilized for this purpose, the choice of the particular method depending upon the particular compounds involved, as will be understood by those skilled in the art.

Other volatile bases which may be used in place of ammonia include, for example, methylamine, dimethylamine, trimethylamine, methyl-ethylamine, ethylamine, diethylamine, triethylamine, n-propylamine, isopropylamine, n-butylamine, isobutylene amine, isoamylamine, and the like. In general any nitrogen base boiling below water, and having a dissociation constant greater than about $10^{-6}$, and greater than the dissociation constant of the heterocyclic base used in the Werner complex, may be used.

Suitable higher-boiling strong bases which may be used for dissolving the Werner complexes or clathrates include for example ethanolamine, methyl n-hexyl amine and the like.

The following examples are cited to illustrate more concretely the results obtainable in the practice of this process. These examples however should not be construed as limiting in scope.

EXAMPLE I

To a 250 ml. 3-necked flask equipped with a stirrer, condenser and thermometer was added 30 g. of Ni(4-methylpyridine)$_4$ (SCN)$_2$, 3 ml. of 4-methylpyridine and 60 ml. of 28% aqueous ammonia. Solution of the Werner complex was complete at 25° C. The mixture was warmed to 35° C. then 30 ml. of water and 23 ml. of mixed xylenes were added to yield a two liquid phase system. The mixture was heated under vacuum (approx. 100 mm. Hg) at 40–45° C. until most of the ammonia had evolved. As evolution of ammonia proceeded blue crystals formed in the xylene phase. The mixture was cooled to 25° C. whereupon it was noted that the aqueous phase was still quite blue in color (indicating ammonia evolution was not complete). The mixture was diluted with 100 ml. of water to reduce the ammonia concentration and the mixture was then stirred for 1 hour at 25° C. Two minutes before filtering 30 ml. of isooctane were added to help extract the m-xylene concentrate.

The mixture was filtered on a Buchner funnel. The solid was very crystalline and filtration was rapid. The filtrate consisted of two liquid phases; a clear and colorless upper hydrocarbon phase and a lower pale blue aqueous phase. The phases were separated and the hydrocarbon phase was analyzed for xylene isomer distribution. The solid clathrate phase was decomposed by redissolving in aqueous 28% ammonia at 50° C., and the hydrocarbon phase produced was separated and analyzed. The analyses are shown in the table below:

Table 1

| Phase | Xylene Isomer Distribution | | | |
|---|---|---|---|---|
| | p- | m- | o- | Et. Bz |
| Feed | 14.84 | 81.43 | 0.7 | 3.35 |
| Crystals | 46.37 | 48.16 | 0.36 | 5.17 |
| Filtrate | 0.94 | 97.18 | 0.40 | 1.47 |

The above analyses show that m-xylene of about 97.2% purity was produced in a single clathration stage. This may be contrasted with the results obtainable when utilizing the methylcellosolve solvent system to resolve the same feed mixture. At 25° C., three stages of clathration were required to produce a final raffinate containing 96% m-xylene, the overall weight ratio of Werner complex/p-xylene being the same in each case.

When other volatile amines, such as methylamine or ethylamine are used in the foregoing example, replacing ammonia on a mole-for-mole basis, substantially the same results are obtained.

EXAMPLE II

Other Werner complexes can be substituted for the nickel tetra (4-methylpyridine) dithiocyanate used in Example I to obtain resolutions of similar efficiency, but wherein isomers other than the para-xylene are sometimes selectively clathrated. For example, in treating a xylene mixture containing 20% p-xylene, 45.5% m-xylene, 19.3% o-xylene and 15.3% ethylbenzene, under conditions described in Example I, the isomers selectively clathrated are as follows:

Table 2

| Werner complex | Isomer selectively clathrated |
|---|---|
| 1. Ni(SCN)$_2$·(3-cyano-pyridine)$_4$ | para. |
| 2. Ni(SCN)$_2$·(3-amido-pyridine)$_4$ | para. |
| 3. Ni(SCN)$_2$·(ethylisonicotinate)$_4$ | para. |
| 4. Ni(SCN)$_2$·(4-hydroxymethyl pyridine)$_4$ | ortho. |
| 5. Mn(CN)$_2$·(4-ethylpyridine)$_4$ | ortho. |
| 6. Mn(CNO)$_2$·(4-ethylpyridine)$_4$ | ortho. |
| 7. Ni(SCN)$_2$·(3-ethyl-4-methyl pyridine)$_4$ | meta. |
| 8. Ni(SCN)$_2$·(4-acetylpyridine)$_4$ | Et. Bz. |

EXAMPLE III

The nickel tetra(4-methyl pyridine) dithiocyanate complex of Example I can also be utilized for the separation of non-hydrocarbon dis-substituted benzene isomers. For example, in utilizing this complex according to the procedure of Example I, the ortho-, meta- and para-isomers of mixed chloro-toluenes, dichloro benzenes, toluidines, nitro-toluenes and methyl anisoles are effectively resolved, in each case the para-isomer being selectively clathrated.

The complexes employed in the above examples may be employed for effecting separations of other mixtures, and may be interchanged in the various examples, to effect varying degrees of resolution. Likewise, many similar complexes could be substituted for those set forth in the examples.

The foregoing disclosure of this invention is not to be considered as limiting since many variations may be made by those skilled in the art without departing from the scope or spirit of the following claims.

I claim:

1. A method for recovering an organic compound from a clathrate thereof with a Werner complex consisting of a salt of a metal of atomic number above 12 coordinated with at least 2 mole proportions of a heterocyclic nitrogen base, which comprises dissolving said clathrate in an aqueous solution of a nitrogen base having a dissociation constant which is (1) greater than about $10^{-6}$, and (2) greater than the dissociation constant of the heterocyclic base of said Werner complex, and separating said organic compound from the aqueous solution of Werner complex.

2. A method as defined in claim 1 wherein said nitrogen base is ammonia.

3. A method as defined in claim 1 wherein said heterocyclic base is a pyridine ring compound, and wherein said metal salt is selected from the class consisting of the thiocyanates, isothiocyanates, cyanates, isocyanates, cyanides and azides of manganese, iron, cobalt and nickel.

4. A method as defined in claim 3 wherein said clathrated organic compound is a benzenoid hydrocarbon.

5. A method as defined in claim 1 wherein said clathrated compound is p-xylene.

6. A method for altering the composition of a mixture of organic compounds including at least one aromatic compound differing in molecular configuration from another compound in said mixture, which comprises (1) forming a solution of a heterocyclic nitrogen base Werner complex in an aqueous solution of a nitrogen base boiling below water, and having a dissociation constant which is (a) greater than about $10^{-6}$ and (b) greater than the dissociation constant of said heterocyclic nitrogen base, (2) mixing the resulting solution with said mixture of organic compounds while simultaneously evaporating said volatile base from the solution until a solid clathrate of said aromatic compound with said Werner complex is precipitated, (3) separating said solid clathrate from the liquid phase, (4) recovering clathrated aromatic compound from said clathrate, and (5) recovering non-clathrated organic compounds from the mother liquor of said clathration step.

7. A method as defined in claim 6 wherein said clathrated aromatic compound is recovered from the clathrate by the method of claim 1.

8. A method as defined in claim 6 wherein said nitrogen base is ammonia.

9. A method as defined in claim 6 wherein said heterocyclic base is a pyridine ring compound, and wherein said metal salt is selected from the class consisting of the thiocyanates, isothiocyanates, cyanates, isocyanates, cyanides and azides of manganese, iron, cobalt and nickel.

10. A method as defined in claim 6 wherein said clathrated organic compound is benzenoid hydrocarbon.

11. A method as defined in claim 6 wherein said clathrated compound is p-xylene.

12. A method for resolving a mixture of disubstituted benzene isomers including a para isomer which comprises (1) forming a solution of a lower 4-alkyl pyridine Werner complex of a metal salt in an aqueous solution of a volatile nitrogen base boiling below water and having a dissociation constant greater than about $10^{-6}$, (2) admixing and agitating the resulting solution with said isomer mixture while simultaneously evaporating said volatile nitrogen base therefrom until a solid clathrate is formed, (3) separating un-clathrated isomers from the resulting mixture, (4) redissolving said clathrate and said evaporated volatile nitrogen base in the remaining aqueous phase thereby liberating said para isomer, and (5) separating the enriched para isomer from the reconstituted Werner complex solution.

13. A method as defined in claim 12 wherein said nitrogen base is ammonia.

14. A method as defined in claim 12 wherein said metal salt is a thiocyanate of a metal of atomic number 25 to 28.

15. A process for resolving a xylene mixture including p-xylene, which comprises (1) forming a solution of a 4-methyl pyridine Werner complex of a metal salt in an aqueous solution of a volatile nitrogen base boiling below water and having a dissociation constant greater than about $10^{-6}$; (2) admixing and agitating the resulting solution with said xylene mixture while simultaneously evaporating said volatile nitrogen base therefrom until a solid clathrate is formed; (3) adding to the resulting mixture a saturated hydrocarbon boiling between about 90° and 135° C.; (4) separating solid clathrate from the clathration mother liquor; (5) separating said mother liquor into a raffinate hydrocarbon phase and an aqueous mother liquor phase; (6) distilling said raffinate hydrocarbon phase to recover (a) an overhead fraction comprising 4-methyl pyridine and said saturated hydrocarbon and (b) a higher boiling fraction comprising raffinate xylenes; (7) recycling said overhead fraction to said step (3); (8) redissolving said clathrate and said evaporated volatile nitrogen base in said aqueous mother liquor phase; (9) adding to the resulting mixture a saturated hydrocarbon boiling between about 90° and 135° C.; (10) separating the resulting mixture into an aqueous Werner complex solution phase and an extract hydrocarbon phase; (11) distilling said extract hydrocarbon phase to recover (a) an overhead fraction comprising 4-methyl pyridine and said saturated hydrocarbon and (b) a higher boiling fraction comprising enriched p-xylene, and (12) recycling said overhead fraction to said step (9).

16. A method as defined in claim 15 wherein said nitrogen base is ammonia.

17. A method as defined in claim 15 wherein said metal salt is a thiocyanate of a metal selected from the class consisting of manganese, iron, cobalt and nickel.

18. A process as defined in claim 15 wherein said saturated hydrocarbon is a $C_8$ paraffin hydrocarbon.

References Cited in the file of this patent

UNITED STATES PATENTS

| | | |
|---|---|---|
| 2,798,891 | Schaeffer | July 9, 1956 |
| 2,905,730 | Ray et al. | Sept. 22, 1959 |